United States Patent [19]
Yoshioka et al.

[11] Patent Number: 5,950,595
[45] Date of Patent: Sep. 14, 1999

[54] METHOD AND APPARATUS FOR CONTROLLING VACUUM PRESSURE IN INTERNAL COMBUSTION ENGINE

[75] Inventors: Yukio Yoshioka; Zenichiro Mashiki, both of Toyota, Japan

[73] Assignee: Toyota Jidosha Kabushiki Kaisha, Toyota, Japan

[21] Appl. No.: 08/982,300

[22] Filed: Dec. 1, 1997

[30] Foreign Application Priority Data

Dec. 3, 1996 [JP] Japan ................................. 8-322739

[51] Int. Cl.$^6$ ............................. F02D 9/08; F02B 17/00; F02M 25/07; B60T 13/52
[52] U.S. Cl. .................... 123/295; 123/399; 123/568.21; 123/568.23; 477/206; 303/114.3
[58] Field of Search .................................. 123/295, 399, 123/430, 432, 308, 568.11, 568.21, 568.23, 568.24; 477/205, 206; 303/114.3; 701/70, 112; 60/411

[56] References Cited

U.S. PATENT DOCUMENTS

| | | | |
|---|---|---|---|
| 2,876,876 | 3/1959 | Cummins | 477/205 |
| 3,799,303 | 3/1974 | Stoltman | 477/206 |
| 3,824,792 | 7/1974 | Grabb et al. | 60/411 |
| 3,947,073 | 3/1976 | Cattaneo et al. | 303/121 |
| 4,610,483 | 9/1986 | Matsumoto et al. | 303/192 |
| 5,091,857 | 2/1992 | Katayama et al. | 701/112 |
| 5,152,587 | 10/1992 | Volz | 303/114.3 |
| 5,826,559 | 10/1998 | Ichimoto et al. | 123/295 |
| 5,846,164 | 12/1998 | Harada | 477/205 |

FOREIGN PATENT DOCUMENTS

| | | |
|---|---|---|
| 1231337 | 9/1960 | France . |
| A 58-23244 | 2/1983 | Japan . |
| A 8-164840 | 6/1996 | Japan . |
| 308680 | 5/1930 | United Kingdom . |

Primary Examiner—Willis R. Wolfe
Attorney, Agent, or Firm—Oliff & Berridge, PLC

[57] ABSTRACT

A method and an apparatus for generating vacuum pressure in an engine is disclosed. The engine includes an intake path, combustion chambers and an exhaust path. Airflow in the intake path is controlled by a throttle valve. An exhaust gas recirculation (EGR) passage deflects a part of flow of the exhaust gas to the intake path from the exhaust path. An EGR valve regulates the flow of exhaust gas passing through the EGR passage. A brake booster is connected to the intake path and increases braking force of the vehicle. A pressure sensor detects the pressure in the booster. A central processing unit determines whether the detected pressure is higher than a predetermined value. The throttle valve is in a relatively open position when the engine performs stratified charge combustion. The throttle valve decreases the pressure in the intake path when the throttle valve restricts flow. The CPU controls the throttle valve to decrease the pressure in the intake path when the booster pressure is higher than the predetermined value and actuates the EGR valve to decrease the gas flow in the EGR passage. This results in better brake and engine performance.

20 Claims, 9 Drawing Sheets

METHOD AND APPARATUS FOR CONTROLLING VACUUM PRESSURE IN INTERNAL COMBUSTION ENGINE

BACKGROUND OF THE INVENTION

The present invention relates to methods and apparatuses for controlling vacuum pressure in internal combustion engines. More particularly, the present invention pertains to methods and apparatuses for controlling vacuum pressure in internal combustion engines having brake boosters, which use vacuum pressure to improve braking force.

In a typical engine, fuel is injected into an intake port from a fuel injection valve to charge a mixture of fuel and air to the associated combustion chamber. The air-fuel mixture is ignited by an ignition plug to produce torque. This type of combustion, in which air-fuel mixture is ignited in a combustion chamber, is generally called homogeneous charge combustion. In an engine performing homogeneous charge combustion, a throttle valve located in an intake passage controls the cross-sectional area of the intake passage thereby controlling the amount of air-fuel mixture supplied to a combustion chamber. The power of the angina is controlled, accordingly. However, a high level of vacuum pressure (a low absolute pressure) is produced by the throttling action of the throttle valve. This increases pumping losses and thus reduces the engine efficiency.

To attempt to solve this problem, stratified charge combustion has been proposed. In stratified charge combustion, a relatively rich air-fuel mixture is delivered to the vicinity of an ignition plug for ensuring the ignition of the mixture, and the generated flame of the mixture burns the surrounding leaner mixture. The power of the engine is basically controlled by changing the amount of fuel injected to the vicinity of the ignition plug. This eliminates the necessity for changing the cross-sectional area of the intake passage to control the engine power, which decreases pumping loss and improves the engine efficiency. Further, stratified charge combustion allows an engine to be operated with a relatively lean air-fuel ratio and thus improves the fuel economy of the engine.

Engines that switch between stratified charge combustion and homogeneous charge combustion in accordance with their running state have been proposed. One such engine has a homogeneous charge fuel injection valve and a stratified charge fuel injection valve. The homogeneous charge injection valve uniformly disperses fuel into the combustion chamber and the stratified charge injection valve injects fuel toward the vicinity of the ignition plug. Another type has a fuel injection valve that directly injects fuel into the combustion chamber and switches between stratified charge combustion and homogeneous charge combustion. Switching to stratified charge combustion from homogeneous charge combustion when the engine load is small improves the engine efficiency and the fuel economy.

Some engines are provided with a brake booster that increases the braking force thereby decreasing the force required to depress the brake pedal. The brake booster uses vacuum pressure, which is produced in the intake passage downstream of the throttle valve, as a drive source. That is, vacuum pressure is communicated with the brake booster through a communicating pipe connected to the downstream side of the throttle valve. Vacuum pressure, which corresponds to the degree of depression of the brake pedal, acts on a diaphragm incorporated in the brake booster and increases the force actuating the brake.

In such an engine, pressure in the intake passage is decreased during homogeneous charge combustion. That is, the vacuum pressure available for actuating the brake booster is sufficiently low. However, pressure in the intake passage is increased during stratified charge combustion. That is, there is less vacuum available. This may result in insufficient vacuum to actuate the brake booster. As a result, the force required to depress the brake pedal is not decreased.

Japanese Unexamined Patent Publication No. 8-164840 discloses an apparatus for controlling vacuum pressure in internal combustion engines for solving this problem. In this apparatus, a throttle valve in an intake passage is closed when the pressure in a brake booster is greater than a predetermined level thereby temporarily lowering the intake vacuum pressure. Accordingly, a sufficiently low vacuum pressure for actuating the brake booster is communicated with the booster.

Incidentally, some engines are provided with an exhaust gas recirculation (EGR) mechanism for reducing exhaust emissions of nitrogen oxide (NOx). An engine having this mechanism includes a passage that communicates the intake duct with an exhaust duct. The passage recirculates some of exhaust gas in the exhaust duct to the intake duct. A flow control valve is located in the passage. The flow valve is controlled by an electronic control unit of the engine to adjust the amount of exhaust gas recirculated to the intake duct. Supplying inert gas, that is, exhaust gas, to intake air in the intake duct lowers the combustion temperature in the combustion chamber thereby reducing the exhaust emission of NOx.

If provided in an engine having the EGR mechanism, the vacuum pressure controlling apparatus of the above publication causes the following problems. In the vacuum pressure controlling apparatus, the throttle valve is closed for producing sufficient vacuum for actuating the brake booster. Closing the throttle valve simultaneously with is recirculation of exhaust gas by the EGR mechanism increases the ratio of recirculated gas in the air drawn into the combustion chamber. Accordingly, the amount of usable intake air supplied to the combustion chamber is abruptly decreased. This temporarily causes the air-fuel ratio in the vicinity of the ignition plug to be excessively rich. The overly rich air-fuel ratio causes misfires in the engine thereby fluctuating the torque of the engine.

SUMMARY OF THE INVENTION

Accordingly, in an engine having a brake booster that uses vacuum pressure to guarantee braking force, it is an objective of the present invention to provide an apparatus for controlling the vacuum pressure that prevents misfires from occurring when vacuum pressure is being produced thereby stabilizing the combustion state of the engine.

To achieve the foregoing and other objectives and in accordance with the purpose of the present invention, an apparatus for controlling vacuum in a vehicle is provided. The vehicle has an engine that performs stratified combustion and homogeneous combustion. The engine includes a combustion chamber, an intake air passage and a throttle valve. The air intake passage introduces air to the combustion chamber. The throttle valve is located in the intake passage for controlling airflow in the intake passage and is movable between a fully open position and a closed position. The throttle valve is in a relatively open position when the engine performs stratified charge combustion and operates to decrease the pressure in the intake passage when the throttle valve is moved toward the closed position. The engine further includes an exhaust passage, recirculation means, and exhaust gas regulator. The exhaust passage discharges exhaust gas from the combustion chamber. The recirculation means connects the exhaust passage with the intake passage to recirculate some of the exhaust gas to the intake passage. The exhaust gas regulator regulates the flow of exhaust gas passing through the recirculation means. The vehicle further includes a brake booster, detecting means, determining means and a controller. The brake booster increases the braking force of the vehicle and has a vacuum pressure chamber connected to the intake passage. The detecting means detects the pressure of the vacuum chamber. The determining means determines whether the pressure in the vacuum chamber is higher than a reference level based on the detected pressure and determines whether the pressure in the vacuum chamber is deficient. The controller controls the exhaust gas regulator to positively restrict the recirculation of exhaust gas when the controller determines that the detected pressure is higher than the reference level.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

One embodiment of an apparatus for controlling vacuum pressure in an internal combustion engine according to the present invention will now be described with reference to the drawings.

Figure 1:
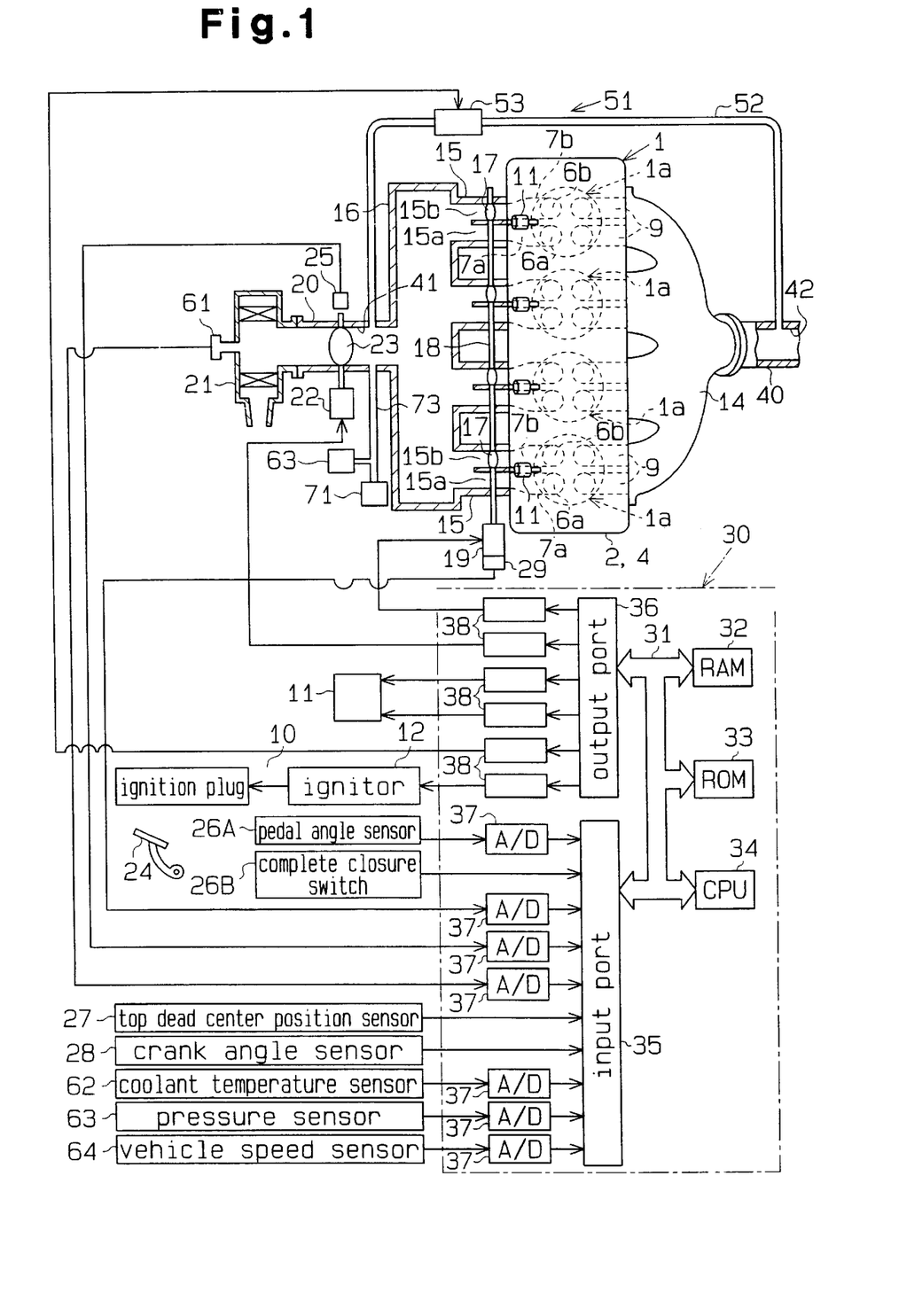
FIG. 1 is a diagrammatic drawing showing an apparatus for controlling vacuum pressure in an engine according to a first embodiment of the present invention.
Figure 2:
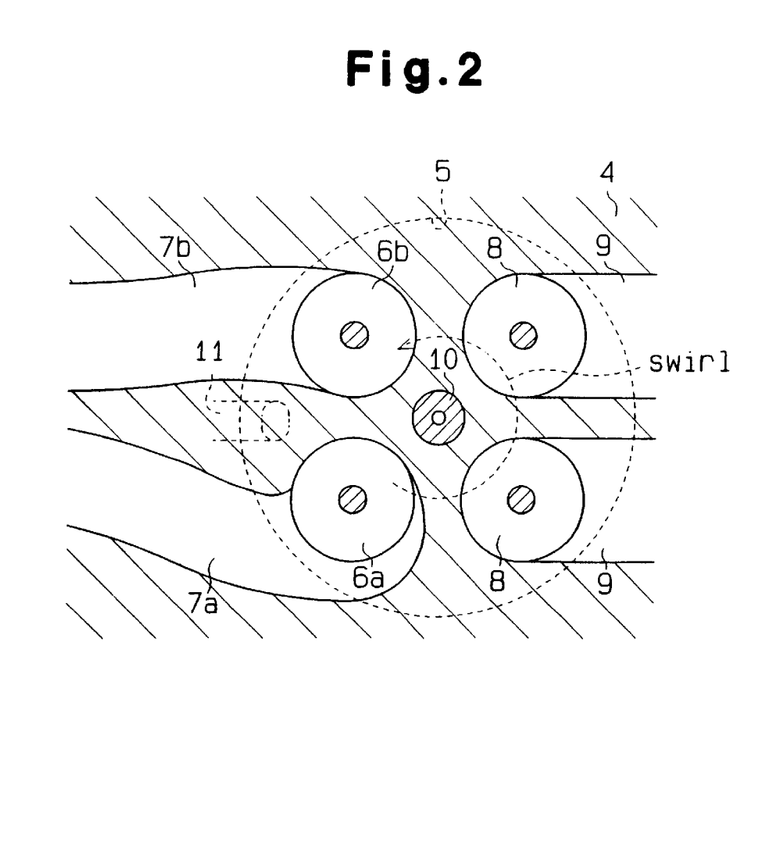
FIG. 2 is an enlarged diagrammatic cross-sectional view showing an engine cylinder.

FIG. 1 is a diagram showing an apparatus for controlling vacuum pressure in a cylinder injection type engine employed in a vehicle according to a first embodiment. As shown in FIG. 1, an engine 1 is provided with four cylinders 1a. The structure of the combustion chamber of each cylinder 1a is shown in FIG. 2. As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4.

A first intake port 7a and a second intake port 7b open to each combustion chamber 5. The ports 7a, 7b are opened and closed by first intake valve 6a and a second intake valve 6b located in the cylinder head 4, respectively. As shown in FIG. 2, the first intake port 7a is a curved port that extends in a helical manner. The second port 7b extends in a generally straight manner. The helical first intake port 7a generates a swirl of intake air. The magnitude of the swirl is controlled by a swirl control valve 17, which will be discussed below.

Ignition plugs 10 are arranged at the middle of the cylinder head 4 to face the combustion chambers 5. High voltage is applied to each ignition plug 10 by an ignitor 12 through a distributor (not shown). Each plug 10 ignites air-fuel mixture in the associated combustion chamber 5.

A fuel injection valve 11 is arranged near the inner wall of the cylinder head 4 in the vicinity of each set of first and second intake valves 6a, 6b in each combustion chamber 5. The fuel injection valve 11 injects fuel directly into the associated combustion chamber 5 of cylinder 1a. The injected fuel is subjected to stratified charge combustion or homogeneous charge combustion.

As shown in FIG. 1, the first and second intake ports 7a, 7b of each cylinder 1a are connected to a surge tank 16 by a first intake passage 15a and a second intake passage 15b, respectively, which are defined in an intake manifold 15. One swirl control valve 17 is located in each second intake passage 15b. The swirl control valves 17 are connected to a step motor 19 by a common shaft 18. The step motor 19 is controlled by signals sent from an electronic control unit (ECU) 30, which will be discussed later, and adjusts the opening of the swirl control valves 17.

The surge tank 16 is connected to an air cleaner 21 through an intake duct 20. A throttle valve 23, which is opened and closed by a step motor 22, is located in the intake duct 20. The throttle valve 23 is electronically controlled. That is, the step motor 22 is actuated by pulse signals from the ECU 30 and adjusts the opening of the throttle valve 23. The opening amount and the speed of the valve 23 is determined by the number and frequency of pulse signals from the ECU 30. The speed of the valve 23 is indicated by a value obtained by dividing the angular velocity ω by the angle θ between the fully closed position and the fully open position of the valve 23 (ω/θ). The opening amount of the throttle valve 23 determines the amount of intake air drawn into the combustion chambers 5 through the intake duct 20 and the magnitude of the vacuum produced in the intake duct 20 downstream of the throttle valve 23.

A throttle sensor 25 is located in the vicinity of the throttle valve 23 to detect the opening angle of the valve 23. The intake duct 20, the surge tank 16 and the first and second intake passages 15a, 15b constitute an intake path 41. The exhaust ports 9 of each cylinder 1a are connected to an exhaust manifold 14. After combustion, the exhaust gas is discharged to the outside through the exhaust manifold 14 and the exhaust duct 40. The exhaust manifold 14 and the exhaust duct 40 constitute an exhaust path 42.

The engine 1 is provided with a conventional exhaust gas recirculation (EGR) mechanism 51 that includes an EGR passage 52 and an EGR valve 53 located in the EGR passage 52. The EGR passage 52 communicates a part of the intake duct 20 at the downstream side of the throttle valve 23 with an exhaust duct 40. The EGR valve 53 includes a valve seat, a valve body, and a step motor (none of which is shown). The ECU 30 sends pulse signals to the step motor thereby actuating it. The step motor then causes the valve body to approach or to separate from the valve seat for changing the opening amount of the valve 53. The opening amount and the speed of the valve 53 is determined by the number and frequency of pulse signals from the ECU 30. The speed of the EGR valve 53 is indicated by a value obtained by dividing the speed of the valve body V by the maximum distance between the valve body and the valve seat (V/L).

When the EGR valve 53 opens, some of the exhaust gas sent into the exhaust duct 40 enters the EGR passage 52. The gas is then drawn into the intake duct 20 via the EGR valve 53. In other words, some of the exhaust gas is recirculated by the EGR mechanism 51 and returned to the air-fuel mixture. The amount of recirculated gas (hereinafter referred to as the EGR amount) is controlled in accordance with the opening amount of the EGR valve 53. Accordingly, the EGR gas, or incombustible inert gas, is mixed with intake air drawn into the combustion chambers 5. This lowers the maximum temperature of the combustion in the combustion chambers thereby reducing the emission of NOx.

Figure 3:
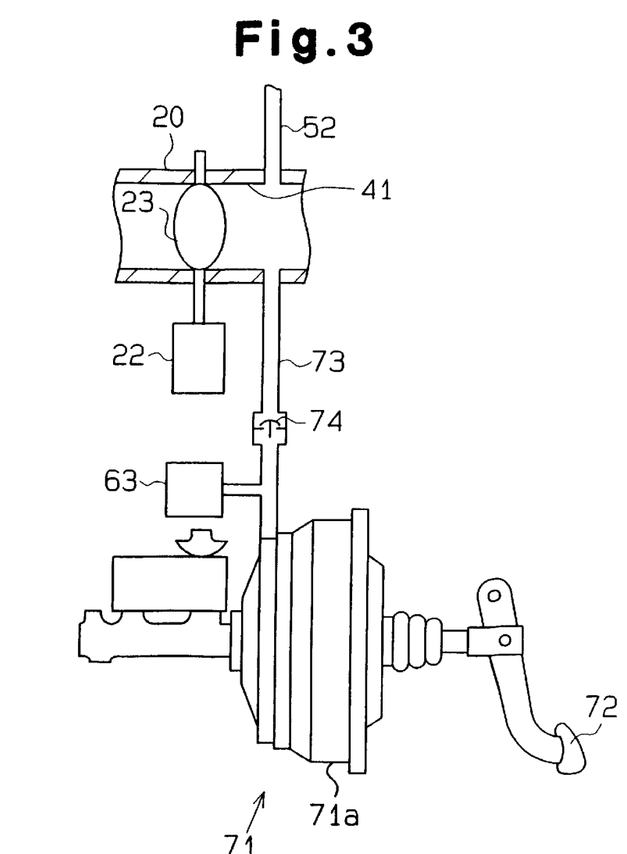
FIG. 3 is a schematic drawing showing the brake booster.

As shown in FIGS. 1 and 3, a brake booster 71 is provided to enhance the braking force of the vehicle. The brake booster 71 increases the pressing force of the brake pedal 72. The pressing force is converted to hydraulic pressure and used to actuate brake actuators (not shown) provided for each wheel. The brake booster 71 is connected to the downstream side of the throttle valve 23 in the intake duct 20 by a connecting pipe 73 and is actuated by the vacuum produced in the duct 20. In other words, the vacuum causes atmospheric pressure to actuate the booster 71.

The brake booster 71 includes a diaphragm (not shown) located in a housing 71a. The diaphragm defines an atmospheric pressure chamber and a vacuum chamber in the housing 71a. The atmospheric pressure chamber is communicated with the atmosphere whereas the vacuum chamber is communicated with the vacuum produced in the intake duct 20 through the connecting pipe 73. Therefore, atmospheric pressure acts on the side of the diaphragm facing the atmospheric pressure chamber and vacuum pressure acts on the other side of the diaphragm, which faces the vacuum chamber.

A check valve 74 is located in the connecting pipe 73. The valve 74 is opened when the pressure in the intake duct 20 is lower than the pressure in the vacuum chamber. Accordingly, the vacuum of the intake duct 20 is communicated with the vacuum chamber. Contrarily, when the pressure in the vacuum chamber is lower than the pressure in the intake duct 20, the check valve 74 is closed. Therefore, the pressure in the vacuum chamber is maintained relatively low. The force of the brake actuators generated by the brake booster 71, or the braking force of the vehicle, is determined by the difference between the atmospheric pressure and the vacuum pressure of the vacuum chamber and the force acting on the brake pedal 72. A pressure sensor 63 is located in the connecting pipe 73 to detect the pressure PBK (absolute pressure) in the vacuum chamber of the brake booster 71.

The ECU 30 is provided with a random access memory (RAM) 32, a read only memory (ROM) 33, a central processing unit (CPU) 34, an input port 35 and an output port 36. The RAM 32, the ROM 33, the CPU 34, the input port 35, and the output port 36 are connected to one another by a bidirectional bus 31

An acceleration pedal 24 is connected to a pedal angle sensor 26A. The pedal angle sensor 26A generates voltage proportional to the degree of depression of the acceleration pedal 24. This enables the acceleration pedal depression amount ACCP to be detected. The voltage output by the pedal angle sensor 26A is input to the CPU 30 by way of an analog-to-digital (A/D) converter 37 and the input port 35. The acceleration pedal 24 is also provided with a complete closure switch 26B, which detects whether the acceleration pedal 24 is not pressed at all. The closure switch 26B outputs a complete closure signal IDL of one when the acceleration pedal 24 is not pressed at all and outputs the complete closure signal IDL of zero when the acceleration pedal 24 is pressed. The output voltage of the closure switch 26B is input to the CPU 34 via the input port 35.

The engine 1 is further provided with a top dead center position sensor 27 and a crank angle sensor 28. The top dead center position sensor 27 generates an output pulse when the piston in one of the cylinders 1a reaches the top dead center position. The output pulse is input to the CPU 34 via the input port 35. The crank angle sensor 28 generates an output pulse each time a crankshaft (not shown) of the engine 1 is rotated by a predetermined crank angle. The output pulse sent from the crank angle sensor 28 is input to the CPU 34 via the input port 35. The CPU 34 reads the output pulses of the top dead center position sensor 27 and the crank angle sensor 28 to compute the engine speed NE.

A swirl control valve sensor 29 is located in the vicinity of the step motor 19. The sensor 29 detects the rotational angle of the shaft 18 thereby measuring the opening area of the swirl control valves 17. The signal output of the swirl control valve sensor 29 is input in the CPU 34 via an A/D converter 37 and the input port 35. Likewise, the signal Output of the throttle sensor 25 is input to the CPU 34 via an A/D converter 37 and the input port 35.

An atmospheric pressure sensor 61 is located in the intake path 41 for detecting the atmospheric pressure PA. A coolant temperature sensor 62 is located in the cylinder block 2 to detect the temperature of the engine coolant. A vehicle speed sensor 64 is provided in the vicinity of a wheel to detect the speed of the vehicle (vehicle speed SPD). The signal output of the sensors 61, 62, 64 is input to the CPU 34 via an A/D converter 37 and the input port 35. Also, the signal output of the pressure sensor 63 is input to the CPU 34 via the A/C converter 37 and the input port 35.

The output port 36 is connected to the fuel injection valves 11, the step motors 19, 22, the ignitor 12, and the EGR valve 53 (step motor) by way of drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–64.

Figure 4:
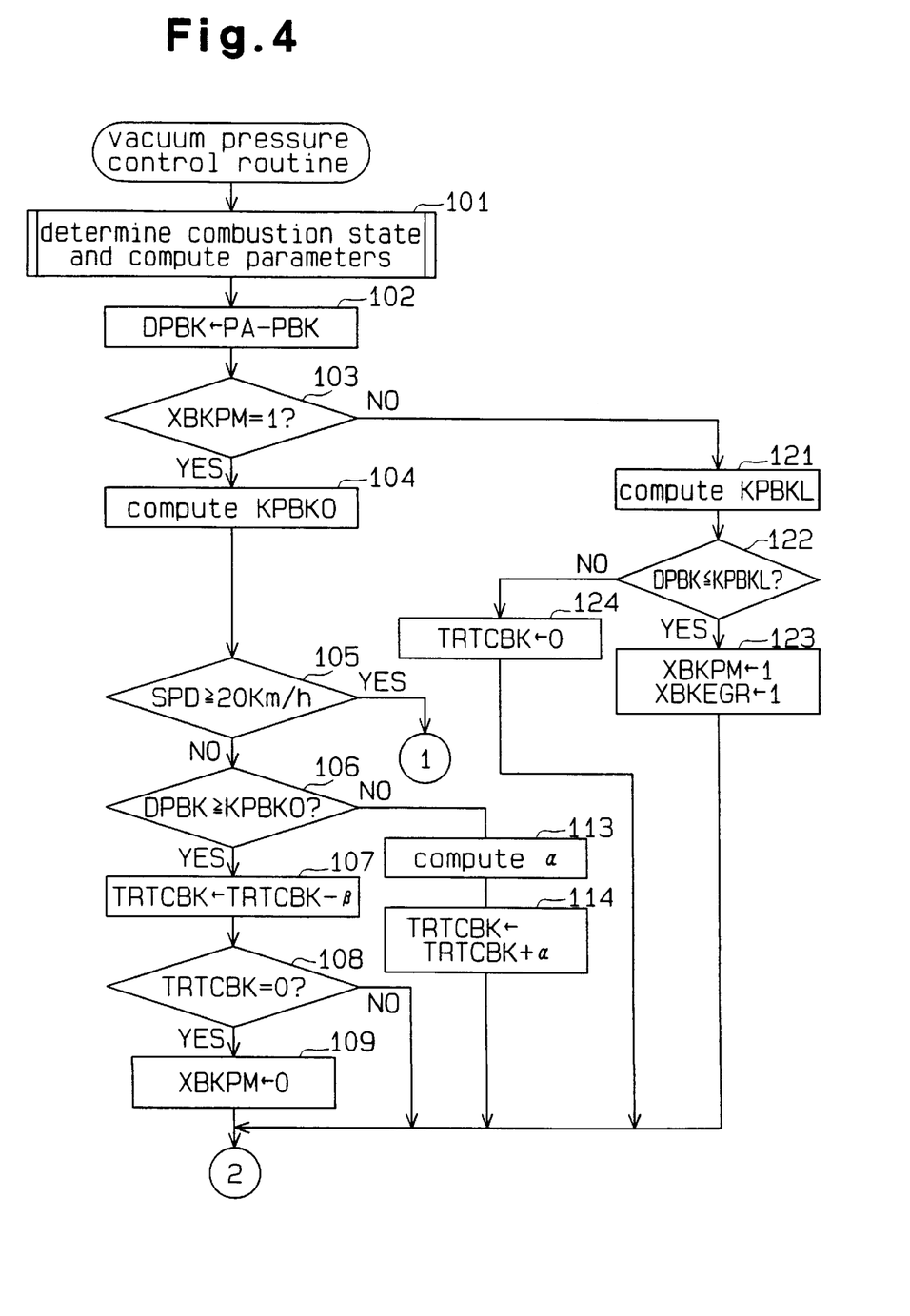
FIG. 4 is a flowchart illustrating the vacuum pressure control routine according to the first embodiment.

Vacuum control performed by the above described apparatus will now be described. FIG. 4 is a flowchart showing a routine of the vacuum control. In this routine, the throttle valve 23 (the step motor 22) is controlled to change the pressure of the vacuum chamber in the brake booster 71. This routine is an interrupt executed by the ECU 30 at every predetermined crank angle.

In step 101, the ECU 30 selects either stratified charge combustion or homogeneous charge combustion based on parameters such as the acceleration pedal depression amount ACCP and the engine speed NE. The ECU 30 also computes various parameters such as ignition timing and the opening amount of the swirl control valve 17 in accordance with the selected combustion state.

At step 102, the ECU 30 subtracts the brake booster pressure PBK detected by the pressure sensor 63 from the atmospheric pressure PA. The ECU 30 substitutes the resultant for a relative pressure value DPBK. The relative pressure value DPBK thus represents the difference between the atmospheric pressure and the pressure PBK in the vacuum chamber of the brake booster 71.

At step 103, the ECU 30 judges whether a request flag XBKPM is set at one. The request flag XBKPM indicates whether a process for producing vacuum is required. Specifically, the flag XBKPM indicates whether vacuum in the vacuum chamber of the brake booster 71 needs to be increased, or whether the absolute pressure in the vacuum chamber needs to be decreased. The process will hereafter be referred to as the vacuum producing process. If the determination of the step 103 is negative, the vacuum producing process was not executed in the previous routine. In this case the ECU 30 moves to step 121.

At step 121, the ECU 30 computes a pressure value KPBLK at which the vacuum producing process is started by referring to function data stored in the ROM 33. The computed pressure value KPBKL corresponds to the current vehicle speed SPD. The pressure value KPBKL indicates whether vacuum in the vacuum chamber of brake booster 71 is too low to actuate the booster 71, that is, whether the pressure in the booster vacuum chamber is too high.

Figure 7:
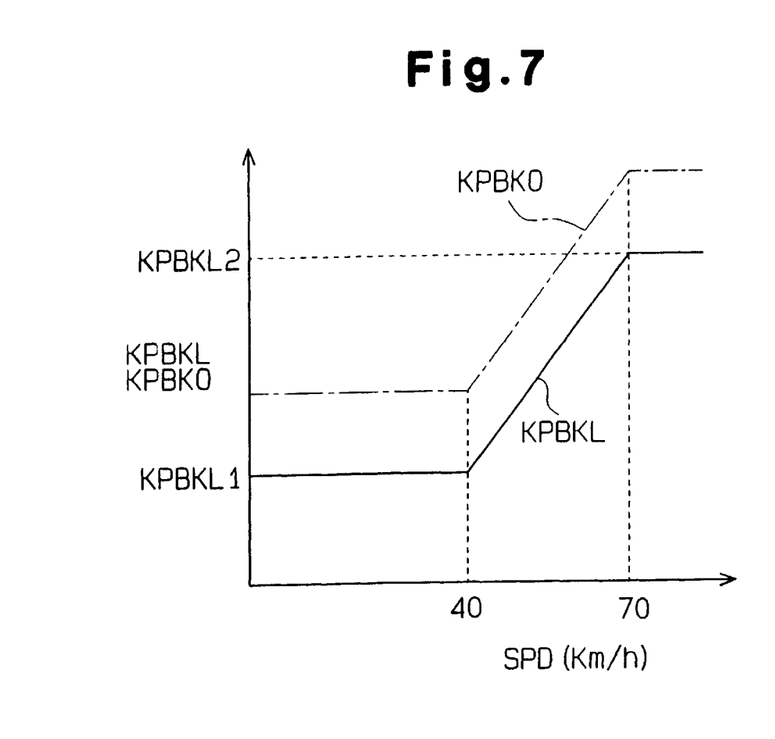
FIG. 7 is a graph showing the relationship between vehicle speed and a pressure value at which a vacuum producing process is started, and the relationship between vehicle speed and a predetermined pressure value at which a vacuum producing process is finished.

FIG. 7 is a graph of the function data used at step 121. As shown in the graph, the starting pressure value KPBKL has a lower value for a lower vehicle speed SPD. For example, when the vehicle speed is 40 Km/h or lower, the pressure value KPBKL is KPBKL1. When the vehicle speed is 70 km/h or higher, the pressure value KPBKL is KPBKL2, which is higher than KPBKL1. The pressure values KPBKL1 and KPBKL2 are determined based on the performance characteristics of the brake booster 71, which depends on the diameter of the diaphragm and the required braking force of the vehicle.

After computing the starting pressure value KPBKL, the ECU 30 moves to step 122. At step 122, the ECU 30 judges whether the relative pressure value DPBK is equal to the starting pressure KPBKL or lower. If the determination is negative, that is, if DPBK is higher than KPBKL, the vacuum in the brake booster 71 is sufficient. In this case, the ECU 30 moves to step 124. At step 124, the ECU 30 substitutes zero for a closing amount TRTCBK of the throttle valve 23. The closing amount TRTCBK represents an amount by which the valve 23 is closed in the current routine.

Figure 5:
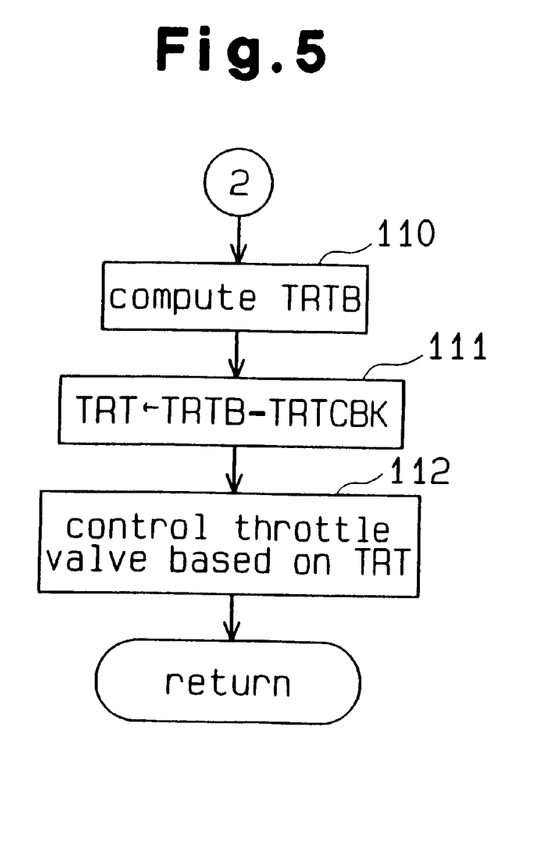
FIG. 5 is a flowchart illustrating a continuation of the vacuum pressure control routine of FIG. 4.

Thereafter, the ECU 30 moves to step 110 shown in the flowchart of FIG. 5. At step 110, the ECU 30 computes a basic throttle opening amount TRTB based on detection signals, such as the acceleration pedal depression amount ACCP and the engine speed NE. When computing the basic throttle opening amount TRTB, the CPU 30 refers to function data (not shown) stored in the ROM 33.

In the subsequent step 111, the ECU 30 subtracts the current throttle closing amount TRTCBK from the basic throttle opening amount TRTB. The ECU 30 substitutes the resultant for the final target throttle opening amount TRT.

At step 112, the ECU 30 outputs a pulse signal corresponding to the target throttle opening amount TRT to the step motor 22 thereby adjusting the opening amount of the throttle valve 23. The ECU 30 then temporarily suspends the current routine. When the determination at step 122 is negative, the ECU 30 moves to step 124, which substitutes zero for the throttle closing amount TRTCBK. Therefore, the target throttle opening amount TRT is set equal to the basic throttle opening TRTB at step 111.

If the determination is positive at step 122, the vacuum in the vacuum chamber of the brake booster 71 is decreased, that is, the absolute pressure in the booster 71 is increased. In this case, the ECU 30 moves to step 123. At step 123, the ECU 30 sets the request flag XBKPM at one, which indicates whether the vacuum producing process is required. Further, the ECU 30 sets a request flag XBKEGR to one. The request flag XBKEGR indicates whether the EGR amount needs to be decreased for increasing the ratio of atmospheric air in the intake air, which is lowered when the vacuum producing process is executed. The request flag XBKEGR is used in an EGR amount control routine, which will be described below.

After executing steps 110–112, the ECU 30 temporarily suspends the current routine. In this case, the target throttle opening amount TRT is equal to the basic throttle opening amount TRTB.

If the determination at step 103 in FIG. 4 is positive, the vacuum producing process was executed in the previous routine. In this case, the ECU 30 moves to step 104.

Figure 11:
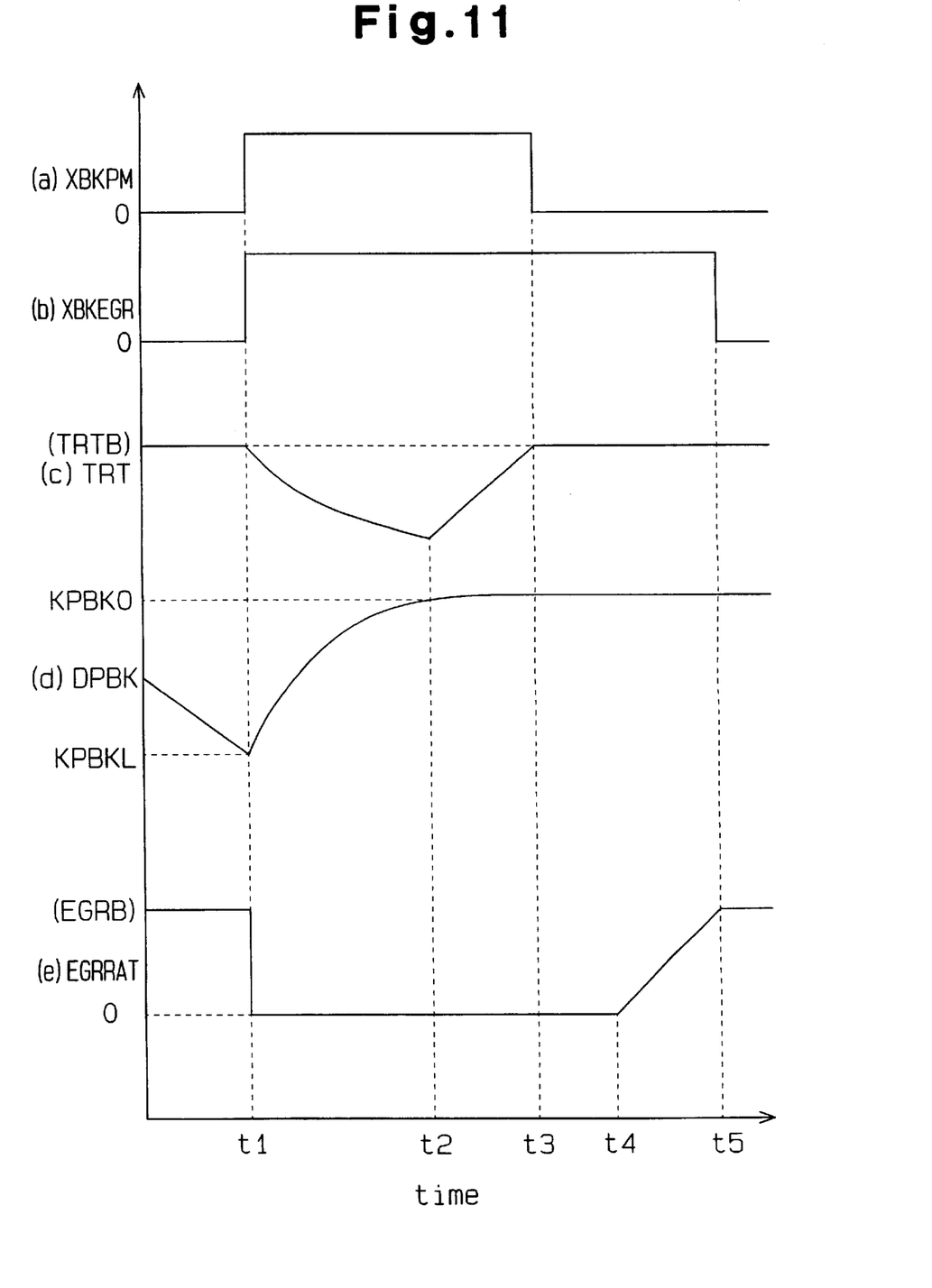
FIG. 11 is a timing chart showing changes, over time, of various variables including the difference between atmospheric pressure and the pressure in a brake booster.

At step 104, the ECU 30 computes a finishing pressure value KPBKO at which the vacuum producing process is terminated. The finishing pressure KPBKO indicates a vacuum chamber pressure that is sufficiently low. The finishing pressure value KPBKO is higher than the starting pressure value KPBKL by a predetermined amount (see dashed line in FIG. 7). However, since the pressure scale of FIG. 11(d) indicates relative pressure, the higher valve KPBKO represents a lower booster vacuum chamber pressure.

At step 105, the ECU 30 judges whether the vehicle speed SPD is 20 Km/h or higher. If the determination is negative, that is, if the vehicle speed SPD is lower than 20 Km/h, the vehicle is moving at a low speed. In this case, the ECU 30 moves to step 106.

At step 106, the ECU 30 judges whether the relative pressure value DPBK is equal to the finishing pressure value KBPKO or higher. If the determination is negative, that is, if DPBK is less than KBPKO, the vacuum producing process is executed, since the vacuum pressure in the vacuum chamber of the brake booster 71 is not considered to be low enough. In this case, the ECU 30 executes steps 113 and 114 for further decreasing the opening amount of the throttle valve 23.

Figure 8:
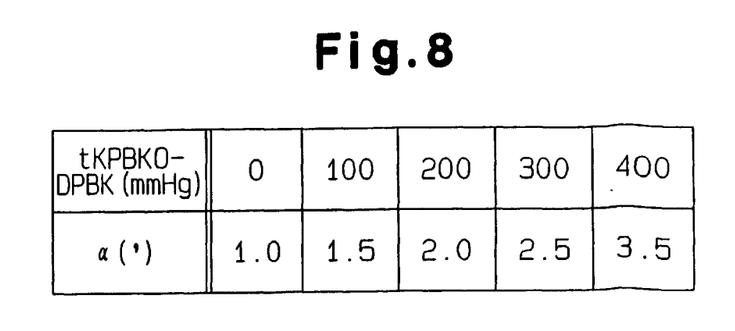
FIG. 8 is a table (map) showing the relationship between a closing compensation amount and a value obtained by subtracting a relative pressure value of a brake booster from a pressure value at which a vacuum producing process is finished.

At step 113, the ECU 30 computes a closing compensation amount a referring to the map shown in FIG. 8. The compensation amounts a are indicated in correspondence with values that are computed by subtracting the relative pressure value DPBK from the finishing pressure value KPBKO. If the computed value is large, the closing compensation amount α also has a large value for increasing closing speed of the throttle valve 23, On the contrary, when the computed value is small, the closing compensation amount a has a small value for decreasing the closing speed of the throttle valve 23.

At step 114, the ECU 30 adds the computed closing compensation amount α to the throttle closing amount TRTCBK. The ECU 30 substitutes the resultant for the throttle closing amount TRTCBK.

The ECU 30 then executes steps 110–112 for adjusting the opening of the throttle valve 23 and temporarily suspends the current routine. In this manner, the ECU 30 increases the throttle closing amount TRTCBK by executing steps 113, 114 and 110–112. Accordingly, the target throttle opening amount TRT decreases. Thus, vacuum in the intake duct 20 downstream of the throttle valve 23 is gradually increased, that is, the absolute pressure downstream of the valve 23 is gradually decreased. The lowered vacuum pressure is communicated with the vacuum chamber of the brake booster 71 by the connecting pipe 73. As a result, the relative pressure DPBK is gradually increased.

If the determination is positive at step 106, the relative pressure DPBK has increased to a sufficient level to actuate the brake booster 71. In this case, the ECU 30 moves to step 107.

At step 107, the ECU 30 subtracts a predetermined value $\beta$ from the current throttle closing amount TRTCBK. The ECU 30 substitutes the resultant for the throttle closing amount TRTCBK. At step 108, the ECU 30 judges whether the throttle closing amount TRTCBK is zero.

If the determination is negative at step 108, the ECU 30 controls the opening of the throttle valve 23 based on the target throttle opening amount TRT, which is gradually increased in steps 110–112. If the determination is positive at stop 108, tho ECU 30 sets the request flag XBKPM, which indicates whether the vacuum producing process is required, at zero. Thereafter, the ECU 30 executes steps 110–112 thereby controlling the opening amount of the throttle valve 23. Since the throttle closing amount TRTCBK is zero, the target throttle opening amount TRT is equal to the basic throttle opening amount TRTB. That is, if the vacuum pressure is sufficient (if the determination is positive at stop 106), the ECU 30 causes the target throttle opening amount TRT to gradually approach the basic throttle opening amount TRTB thereby gradually enlarging the opening amount of the throttle valve 23.

Figure 6:
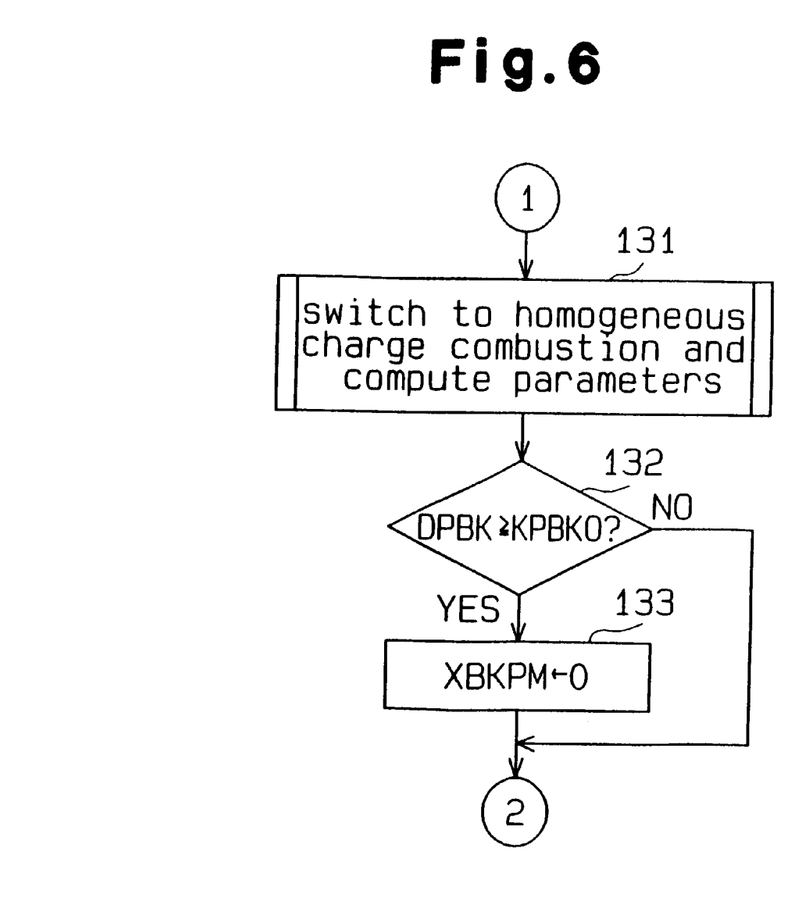
FIG. 6 is a flowchart illustrating a continuation of the vacuum pressure control routine of FIG. 4.

The above described steps 106–109, 113 and 114 are designed to decrease the opening amount of the throttle valve 23 when the determination is negative at step 105, that is, when the vehicle speed SPD is lower than 20 Km/h, for producing sufficient vacuum to actuate the brake booster 71. Since the vehicle speed SPD is lower than 20 Km/h, the engine 1 is generally performing stratified charge combustion when steps 106–109, 113 and 114 are executed.

If the determination is positive at step 105, the ECU 30 switches the combustion state of the engine 1 to homogeneous charge combustion thereby producing sufficient vacuum pressure.

Specifically, the ECU 30 moves to step 131 from step 105 and switches the combustion state of the engine 1 to homogeneous charge combustion. At the same time, the ECU 30 computes various parameters such as an ignition timing that corresponds to homogeneous charge combustion and the opening amount of the swirl control valves 17.

In the subsequent step 132, the ECU 30 judges whether the relative pressure value DPBK is equal to or greater than the pressure value KPBKO, at which the vacuum producing process is finished. If the determination is negative, that is, if DPBK is smaller than KPBKO, the ECU 30 computes the basic throttle opening amount TRTB, which corresponds to homogeneous charge combustion, at steps 110–112. Since the throttle closing amount TRTCBK is zero, the ECU 30 controls the opening amount of the throttle valve 23 based on the target throttle amount TRT, which is equal to the basic throttle opening amount TRTB.

When performing homogeneous charge combustion, the basic throttle opening amount TRTB is smaller than that in stratified charge combustion, and the throttle valve 23 significantly decreases the cross-sectional area of the intake path 41. This quickly increases the relative pressure DPBK, which is the difference between the atmospheric pressure PA and the brake booster pressure PBK.

If the determination is positive at step 132, the vacuum pressure in the vacuum chamber of the brake booster 71 is sufficient, and the vacuum producing process is thus no longer necessary. The ECU 30 therefore sets the request flag XBKPM at zero. Then, after executing steps 110–112, the ECU 30 temporarily suspends the current routine.

As described above, when the relative pressure value DBPK is lower than the pressure value KPBKL, at which the vacuum producing process is started, the ECU 30 either decreases the opening amount of the throttle valve 23 or switches the combustion state of the engine 1 to homogeneous charge combustion, based on the vehicle speed SPD. The ECU 30 continues the chosen process until the relative pressure value DBPK exceeds the finishing pressure value KBPKO.

The EGR amount control routine according to this embodiment will now be described with reference to FIGS. 9 and 10. This routine is an interrupt executed by the ECU 30 at every predetermined crank angle. However, the EGR amount is changed only after the flag XBKEGR is set at one in the vacuum pressure control routine.

Figure 9:
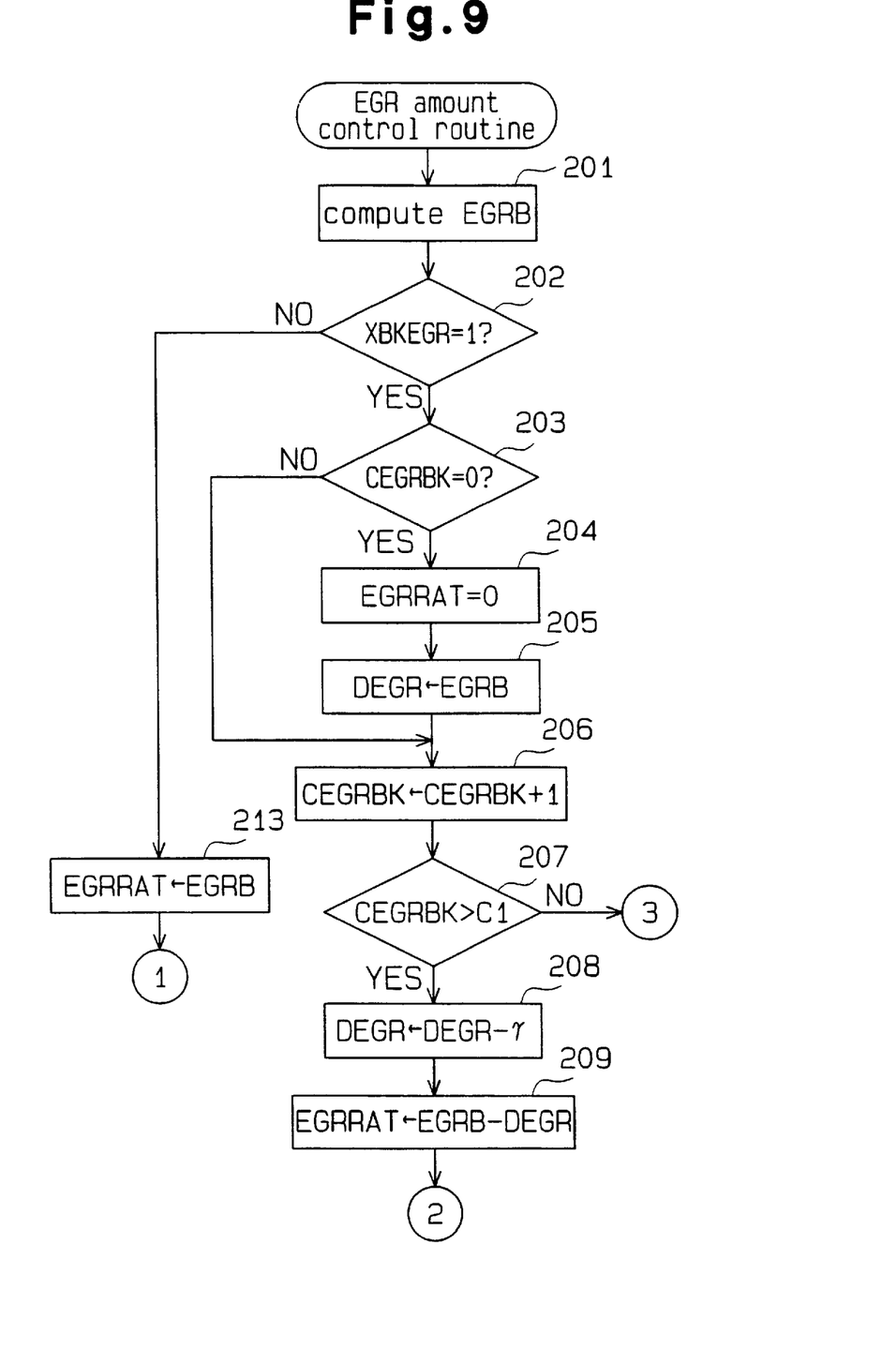
FIG. 9 is a flowchart illustrating the EGR amount control routine according to the first embodiment.

At step 201 of FIG. 9, the ECU 30 computes a basic EGR opening amount EGRB. At this time, the ECU 30 refers to function data of the relationship between the basic EGR opening EGRB and the engine speed NE and function data of the relationship between the basic EGR opening EGRB and the fuel injection amount, which are previously stored in the ROM 33.

At step 202, the ECU 30 judges whether the request flag XBKEGR is one. If the determination is negative, the vacuum producing process is not being executed. The ECU 30 therefore judges that the EGR amount does not need to be reduced and moves to step 213.

At step 213, the ECU 30 equalizes a target EGR opening amount EGRRAT with the basic EGR opening amount EGRB. The ECU 30 then moves to step 214 shown in FIG. 10. At step 214, the ECU 30 actuates the step motor of the EGR valve 53 based on a pulse signal that corresponds to the target EGR opening amount EGRRAT thereby controlling the opening amount of the EGR valve 53.

If the determination is positive at step 202, the amount of intake air starts to decrease because the vacuum producing process is started. The ECU 30 thus executes step 203 and subsequent steps for temporarily decreasing the EGR amount. This process is referred to as the EGR amount decreasing process.

Specifically, the ECU 30 judges whether a counter value CEGRBK is zero at step 203. The counter value CEGRBK is indicative of time that has elapsed since the EGR amount decreasing process was started. Therefore, when step 203 is executed for the first time since the vacuum producing process was started, the determination is always positive because the counter value CEGRBK has been reset to zero. If the determination at step 203 is positive, the ECU 30 moves to step 204 for resetting the target EGR valve opening amount EGRRT to zero. As a result, the EGR mechanism 51 stops recirculation of exhaust gas. If the response delay of the mechanism 51 is not taken into consideration, the EGR amount immediately becomes zero.

At the subsequent step 205, the ECU 30 equalizes the EGR valve closing amount DEGR with the basic EGR valve opening amount EGRB. The EGR valve closing amount DEGR corresponds to a decrease in EGR amount in the current routine.

The determination is negative at step 203 if the target EGR valve opening amount EGRRAT and the EGR valve closing amount DEGR were initialized in steps 204 and 205. In this is case, the ECU 30 moves to step 206.

At step 206, the ECU 30 increments the counter value CEGRBK by one. At step 207, the ECU 30 judges whether the counter value CEGRBK has exceeded a determination value C1. The determination value C1 is indicative of a time period during which the target EGR valve opening amount EGRRAT is maintained at zero.

The determination value C1 is amply longer than the time period during which the vacuum producing process is executed. Thus, from start of the vacuum producing process to its end, the target EGR valve opening amount EGRRAT is zero, that is, recirculation of EGR gas is prohibited.

If the determination is negative at step 207, sufficient time has not elapsed since the vacuum producing process was started and the EGR amount decreasing process needs to be continued. In this case, the ECU 30 moves to step 214 in FIG. 10. At step 214, the ECU 30 controls the EGR valve 53. If the determination at step 207 is negative and the ECU 30 executes step 214 thereafter, EGRRAT must be zero. The EGR valve 53 is therefore controlled to be fully closed.

If the determination is positive at step 207, the vacuum producing process was executed and has finished. In this case, the ECU 30 moves to step 208. At steps 208 and 209, the ECU 30 gradually increases the target EGR valve opening amount EGRRAT.

Specifically, the ECU 30 subtracts a predetermined value γ from the current EGR valve closing amount DEGR and substitutes the resultant for the EGR valve closing amount DEGR. At step 209, the ECU 30 subtracts the EGR closing amount DEGR from the basic EGR valve opening amount EGRB and substitutes the resultant for the target EGR valve opening amount EGRRAT. Since the EGR valve closing amount DEGR is gradually decreased by step 208. The target EGR valve opening amount EGRRAT is gradually increased, accordingly.

At step 210, the ECU 30 judges whether the EGR valve closing amount DEGR is zero. If the determination is negative, the ECU 30 executes step 214 and temporarily suspends the current routine.

If the determination is positive at step 210, the target EGR valve opening amount EGRRAT was set equal to the basic EGR valve opening amount EGRB and tho target EGR valve opening amount EGRRAT does not need to be further increased. The ECU 30 therefore terminates the EGR amount decreasing process and moves to step 211.

At steps 211 and 212, the ECU 30 prepares for the next routine. Specifically, the ECU 30 resets the counter value CEGRBK and a request flag XBKERG, which indicates whether the EGR amount needs to be decreased, to zero, respectively. Thereafter, the ECU 30 executes step 214 and temporarily suspends the current routine.

FIG. 11 is a timing chart showing one example of changes in flags and parameters when the throttle valve 23 and the EGR valve 53 are controlled by the vacuum pressure control routine and the EGR amount control routine, respectively. In this example, the vehicle speed SPD is lower than 20 Km/h. The charts 11 (a)–(e) represent changes in the request flag XBKPM, which indicates whether a process for producing vacuum is required, the request flag XBKEGR, which indicates whether the EGR amount needs to be decreased, the target throttle opening amount TRT, the relative pressure value DPBK, which represents the difference between the atmospheric pressure and the brake booster pressure PBK, and the target EGR valve opening amount EGRRAT, respectively.

At a time t1, the relative pressure value DPBK decreases to the pressure value KPBKL, at which the vacuum producing process is started. Accordingly, the request flags XBKPM and XBKEGR are set to one. This initiates the vacuum producing process and the EGR amount decreasing process. The target throttle opening amount TRT starts to gradually decrease and the target EGR valve opening amount EGRRAT is set at zero. Thus, the throttle valve 23 decreases the cross-sectional area of the intake path 41 thereby increasing the vacuum pressure at the downstream of the valve 23. At the same time, the EGR valve 53 is maintained closed. As a result, the relative pressure value DPBK is increased while the recirculation of EGR gas by the EGR mechanism 51 is stopped. The vacuum pressure in the vacuum chamber of the brake booster 71 is gradually increased, accordingly.

In this manner, when the vacuum pressure is increased by decreasing the opening amount of the throttle valve 23, the EGR valve 53 is fully closed for stopping the recirculation of EGR gas. This increases the ratio of the outside air in the intake air. As a result, misfires of the engine 1, which are caused by a shortage of intake air, are avoided and the combustion state of the engine 1 is thus stabilized. Since the recirculation of highly pressurized EGR gas is stopped, the vacuum pressure in the intake path 41 is increased. Therefore, the required closing amount of the throttle valve 23 for producing a certain level of vacuum pressure is decreased, accordingly. Thus, the intake amount is not suddenly decreased by a significant amount. This further improves the combustion state of the engine 1.

As described above, the speed at which the target throttle opening amount TRT decreases, that is, the closing speed of the throttle valve 23 (the throttle valve closing speed V1) is represented by V1=ω/θ. The speed at which the target EGR valve opening amount EGRRAT decreases, that is, the closing speed of the EGR valve 53 (the EGR valve closing speed V2) is represented by V2=V/L. Since the target EGR valve opening amount EGRRAT is set to zero, that is, the EGR valve 53 is instantly closed, when the vacuum producing process is started, V1 is always smaller than V2 (V1<V2)

That is, the EGR valve 53 is quickly closed for reducing the EGR amount upon a prediction that intake air amount will be decreased. Therefore, even if the EGR mechanism 51 has a response delay, that is, even if there is a time lag between a time at which the EGR valve 53 is controlled to close and a time at which the EGR valve 53 actually closes, the EGR amount is decreased before intake air amount starts to decrease. As a result, the amount of intake air is not abruptly dropped when the throttle valve 23 starts closing. The combustion state of the engine 1 is thus stabilized.

The difference between the atmospheric pressure PA and the brake booster pressure PBK is computed and represented by the relative pressure DPBK. When the relative pressure DPBK is smaller than the pressure value KPBKL, the vacuum producing process is started. As described above, the braking force of the brake booster 71 changes according to the difference between the atmospheric pressure communicated with the atmospheric pressure chamber and the vacuum pressure (the brake booster pressure PBK) communicated with the vacuum chamber by the connecting pipe 73. Therefore, when traveling at a high altitude, the atmospheric pressure PA is relatively low. Thus, even if the brake booster pressure PBK is constant, the braking force of the booster 71 is decreased.

However, vacuum pressure is produced when the relative pressure DPBK, and not the brake booster pressure PBK, is smaller than the starting pressure KPBKL. Therefore, when the braking force is decreased by a low atmospheric pressure PA, the vacuum producing process is started for producing sufficient vacuum for actuating the brake booster 71.

When judging whether the vacuum producing process needs to performed, the relative pressure value DPBK is compared with the starting pressure value KPBKL. Generally, when the vehicle speed SPD is high, a greater braking force is needed for stopping the vehicle. Therefore, the relative pressure value DPBK needs to be greater. Contrarily, when the vehicle speed SPD is low, the required braking force is small. Therefore, the relative pressure value DPBK is not necessarily great. In this manner, the required braking force of the vehicle changes in accordance with the vehicle speed SPD.

In this embodiment, the starting pressure value KPBKL and the finishing pressure value KPBKO have small values for lower vehicle speed SPD. Thus, the relative pressure value DPBK is controlled to a sufficient level for obtaining a desired braking force. Therefore, unnecessary vacuum producing processes are not executed, that is, the amount of intake air does not fluctuate. This prevents torque fluctuations and improves the fuel economy.

In addition, when increasing the throttle closing amount TRTCBK, the closing compensation amount α computed in the current routine is added to tho throttle closing amount TRTCBK of the previous routine. The closing compensation amount α is set at a greater value when the difference between the finishing pressure value KPBKO and the relative pressure DPBK is great thereby increasing the closing speed of the throttle valve 23. Contrarily, when the pressure difference (KPBKO–DPBK) is small, the closing compensation amount α is set at a small value for decreasing the closing speed of the throttle valve 23.

As shown in FIG. 11(d), if the pressure difference (KPBKO–DPBK) is great immediately after the vacuum producing process is started, the closing speed of the valve 23 is great. Therefore, necessary vacuum pressure is quickly produced. Contrarily, when the relative pressure value DPBK (the difference between the atmospheric pressure PA and the pressure PBK in the brake booster 71) approaches the pressure KPBKO, at which the vacuum producing is finished, and the difference (KPBKO–DPBK) is smaller, (in the vicinity of time t2, which will be described below), the closing speed of the valve 23 is lowered. Thus, the relative pressure value DPBK (the difference between the atmospheric pressure PA and the pressure PBK in the brake booster 71) is converged with the pressure value KBPKO in a stable manner.

At a time t2, the increased relative pressure value DPBK reaches the finishing pressure value KPBKO. After the time t2, the target throttle opening TRT is gradually increased. Accordingly, the pressure in the intake path 41 starts to increase. Therefore, the brake booster pressure PBK becomes lower than the pressure in the intake path 41, or, in another manner of thinking, the brake booster pressure PBK has a greater vacuum. At this time, intake air in the intake path 41 tends to be drawn into the vacuum chamber of the brake booster 71 by the connecting pipe 73. However, this flow of intake air is stopped by the check valve 74. Thus, although the vacuum pressure in the intake path 41 is decreased, the brake booster pressure PBK is maintained equal to the finishing pressure KPBKO.

Further, in this embodiment, when sufficient vacuum is produced in the brake booster 71, the target throttle opening amount TRT is gradually increased to the basic throttle opening amount TRTB. Therefore, compared to quickly returning the target throttle opening amount TRT to the basic throttle opening amount TRTB, the amount of intake air is gradually changed. Therefore, undesirable torque fluctuation is avoided. This improves the engine performance.

The vacuum producing process is started when the relative pressure value DPBK is smaller than the starting pressure value KPBKL. The process is continued after the relative pressure value DPBK exceeds the starting pressure value KPBKL. Eventually, the relative pressure DPBK equals the finishing pressure value KPBKO, which is higher than the pressure value KPBKL. Thereafter, the target throttle opening amount TRT is controlled to gradually approach the basic throttle opening amount TRTB. When TRT equals TRTB, the request flag XBKPM is set at zero, that is, the vacuum producing process is terminated. In the process, target values (the pressure values KPBKL and KPBKO) have a hysterisis. This prevents hunting, or prevents the vacuum producing process from repeatedly starting and stopping, thereby stabilizing the control of the engine 1.

At a time t3, the throttle closing amount TRTCBK is zero and the vacuum producing process is finished and the flag XBKPM is set to zero. The time period corresponding to the determination value C1 is sufficiently long. Therefore, the target EGR valve opening amount EGRRAT is maintained at zero from the start to the end of the vacuum producing process. The recirculation of the EGR gas is thus prevented.

In this manner, when the vacuum producing process is executed and the amount of intake air is decreased, the EGR gas is not recirculated. Therefore, mixture is not made overly rich due to a lack of air.

At the time t4 and after, sufficient time has elapsed from the start of the vacuum producing process and the process has finished. Therefore, the target EGR valve opening amount EGRRAT is gradually increased. The EGR amount is increased accordingly. In this manner, the target EGR valve opening amount EGRRAT is gradually increased. This prevents the EGR amount from being abruptly increased thereby eliminating torque fluctuations.

At the time t5, the EGR valve closing amount DEGR is zero and the target EGR valve opening amount EGRRAT is equal to the basic EGR valve opening EGRRAT. Therefore, the request flag XBKEGR, which indicates whether the EGR amount needs to be decreased, is reset to zero.

When the vehicle speed is 20 Km/h or higher, the combustion state of the engine 1 is switched to homogeneous charge combustion for producing vacuum. In this case, the same advantages result. That is, the amount of intake air is not suddenly decreased thereby stabilizing the combustion.

When the vehicle is moving at a low speed, the engine 1 is running with a small load and the combustion state of the engine 1 is generally stratified charge combustion. In this small load running state, switching from stratified charge combustion to homogeneous charge combustion temporarily increases the engine torque thereby degrading the engine performance.

However, in this embodiment, vacuum pressure is produced by switching from stratified to homogeneous charge combustion only when the vehicle speed SPD is 20 Km/h or faster. Therefore, the engine performance is improved.

Figure 12:
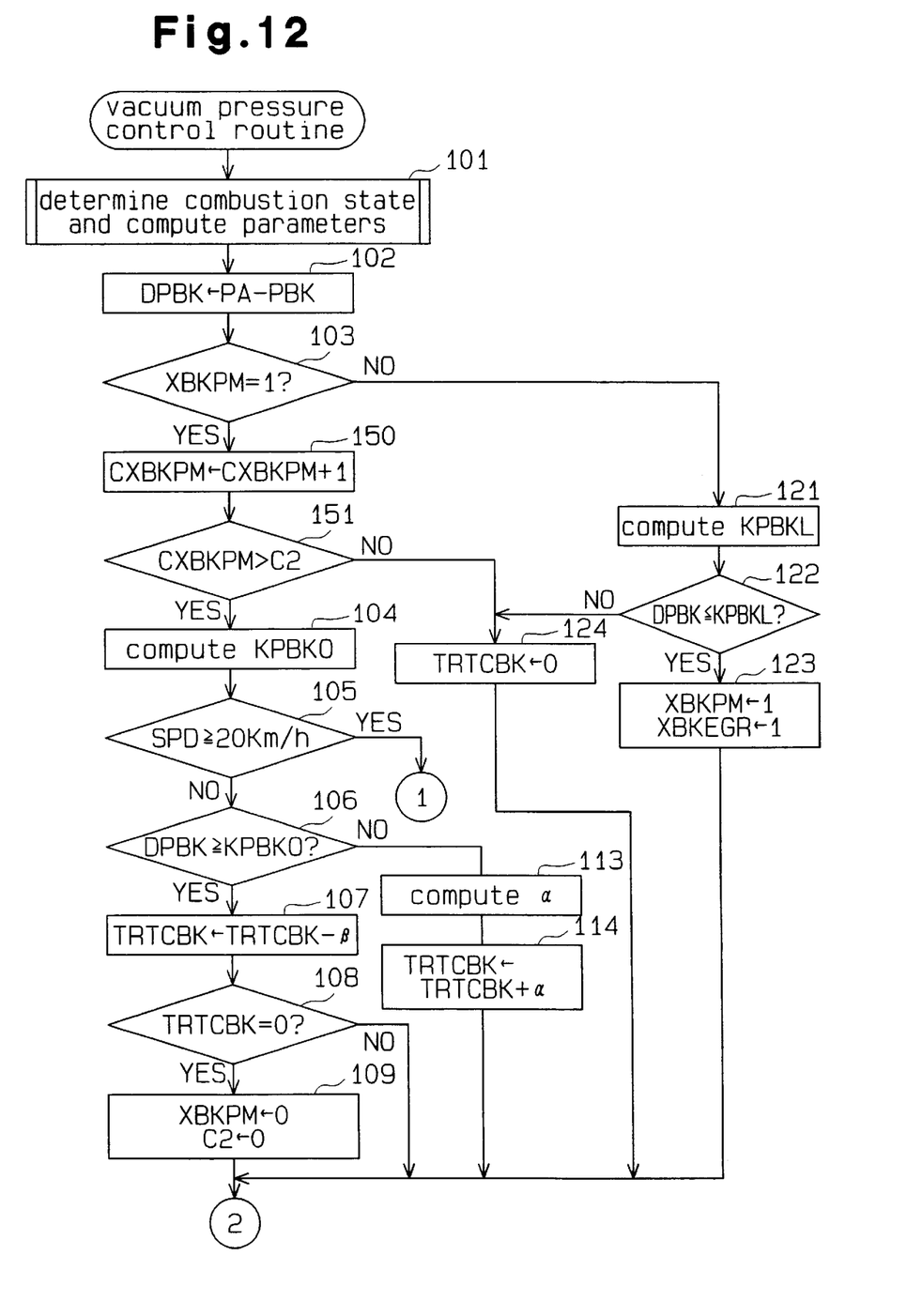
FIG. 12 is a flow chart illustrating a vacuum pressure control routine according to a second embodiment.

A second embodiment of the present invention will now be described with reference to FIG. 12. FIG. 12 is a flowchart showing a part of vacuum pressure control routine according to the second embodiment. In this routine, like or the same reference numerals are given to those steps that are like or the same as the corresponding steps of the first embodiment.

Figure 10:
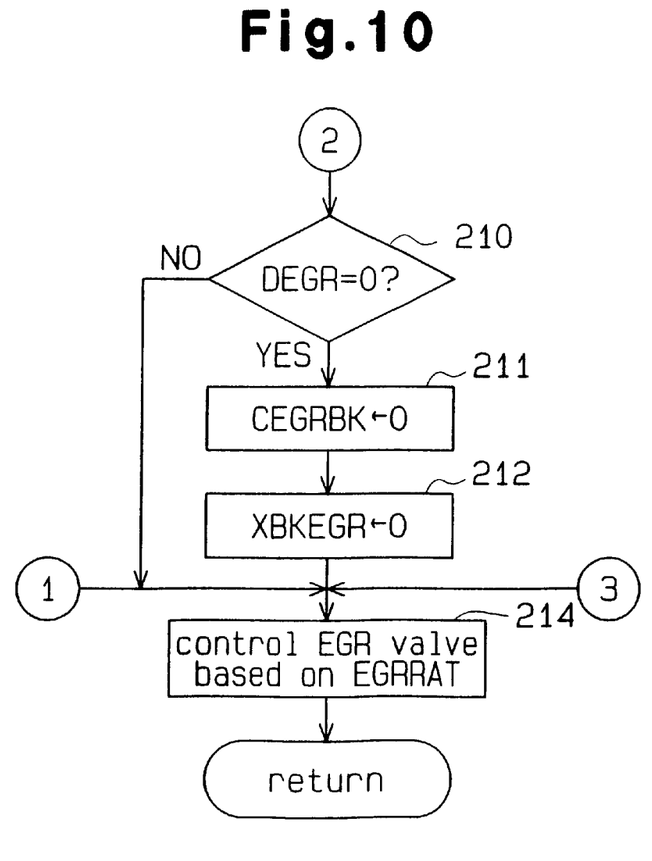
FIG. 10 is a flowchart illustrating a continuation of the EGR amount control routine of FIG. 9.

In this embodiment, the vacuum pressure control routine shown in FIGS. 4–6 and the EGR amount control routine shown in FIGS. 9 and 10 are executed. In addition to the vacuum pressure control routine of the first embodiment, the routine of this embodiment has steps 150 and 151, which will be described below.

If the determination is positive at step 103, the ECU 30 moves to step 150. At step 150, the ECU 30 increments a counter value CXBKPM by one. The counter value CXBKPM represents the time period that has elapsed since the request flag XBKPM, which indicates whether the vacuum producing process is required, has a value of one.

At step 151, the ECU 30 judges whether the counter value CXBKPM is greater than a determination value C2. The value C2 corresponds to a time period that is longer than the response delay of the EGR mechanism 51. If the determination is negative, the predetermined time period has not elapsed since the request flag XBKPM was set to one. The ECU 30 therefore moves to step 124.

If the determination is positive at step 151, the ECU 30 executes step 104 and the subsequent steps. At step 109, the request flag XBKPM is reset to zero and the counter value CXBKPM is also reset to zero.

In this embodiment, even if the request flag XBKPM is set at one, step 104 and the subsequent steps are not executed until the predetermined period of time has elpased. Therefore, the EGR amount decreasing process in the EGR amount control routine of FIGS. 9 and 10 is executed prior to the vacuum producing process.

Therefore, even if the EGR mechanism 51 has a response delay, the recirculation of EGR gas is stopped when the vacuum producing is executed. This prevents the intake air amount from being abruptly dropped thereby stabilizing the combustion state of the engine 1.

It should be apparent to those skilled in the art that the present invention may be embodied in many other specific forms without departing from the spirit or scope of the invention. Particularly, it should be understood that the invention may be embodied in the following forms.

(1) In the embodiments of FIGS. 1–12, the relative pressure value DPBK is computed by subtracting the brake booster pressure PBX from the atmospheric pressure PA. Whether vacuum needs to be produced for actuating the brake booster 71 is determined by judging whether the relative pressure value DPBK is lower than the starting pressure value XPBKL. However, whether vacuum needs to be produced may be determined by judging whether the brake booster pressure PBK is higher than a predetermined pressure value.

(2) In the embodiments of FIGS. 1–12, the starting pressure value KPBKL and the finishing pressure value KPBKO are determined based on vehicle speed SPD. However, pressure values KPBKL and KPBKO may have constant values. In this case, the pressure values KPBKL and KPBKO must be high enough to positively actuate the brake booster 71. Whether the vehicle is decelerating may be judged based on a complete closure signal from the complete closure switch 26B. If the vehicle is judged to be decelerating, the pressure values KPBKL and KPBKO may be changed to lower values. That is, even at the same vehicle speed SPD, if the vehicle is decelerating, the required braking force for stopping the vehicle is relatively small.

(3) In the embodiment of FIG. 12, the vacuum producing process is executed after a predetermined time period has elapsed after the request flag XPBKPM, which indicates whether the vacuum producing process is required, is set to one. Therefore, the EGR valve 53 is closed before the throttle valve 23 is closed. However, a determination pressure value that is higher than the starting pressure value KPBKL may be used. That is, the EGR valve 53 is fully closed when the relative pressure value DPBK is equal to or lower than the determination pressure value. If the relative pressure DPBK decreases and becomes lower than the determination pressure value, the relative pressure value DPBK is likely to decrease to a level lower than the starting pressure value KPBKL. Thus, the EGR valve 53 is closed earlier upon a prediction that the pressure value DPBK will become lower than the starting pressure value KPBKL. As in the embodiment of FIG. 12, the EGR valve 53 is securely closed before the throttle valve 23 starts closing thereby stopping the recirculation of the EGR gas.

(4) In the embodiments of FIGS. 1–12, the EGR valve 53 is fully closed for stopping the recirculation of EGR gas. However, as long as an abrupt decrease of the intake air amount is avoided, the EGR valve 53 needs not be completely closed.

(5) In the embodiments of FIGS. 1–12, the determination value C1 of the counter value CEGRBK is set to have a sufficiently long time period. Thus, the EGR valve 53 is opened after the throttle closing amount TRTCBK is zero and the vacuum producing process is completely finished. However, step 207 shown in FIG. 9 may be replaced with a step for judging whether the request flag XBKPM is zero. In this case, if the determination is positive at step 207, the EGR valve 53 is gradually opened.

(6) In the embodiments of FIGS. 1–12, the throttle closing amount TRTCBK is gradually decreased when the relative pressure value DPBK exceeds the finishing pressure value KPBKO. However, the throttle closing amount TRTCBK may be decreased when a predetermined time period has elapsed after the relative pressure value DPBK exceeds the finishing pressure value KPBKO. This stabilizes the relative pressure value DPBK and prevents hunting caused by repetitive positive and negative determinations at step 106.

(7) In the embodiments of FIGS. 1–12, the target EGR valve opening EGRRAT is immediately changed to zero when the request flag XBKEGR, which indicates whether the EGR amount needs to be decreased, is set to one. However, the target EGR valve opening amount EGRRAT may be gradually decreased after the request flag XBKEG is set to one.

(8) In the embodiments 1–12, if the vacuum producing process needs to be executed when the vehicle speed SPD is equal to or higher than 20 Km/h, the combustion state of the engine 1 is switched to homogeneous charge combustion. When the vehicle speed SPD is lower than 20 Km/h, the opening amount of the throttle valve 23 is decreased. However, the vacuum producing process may be always performed by decreasing the opening amount of the throttle valve 23 regardless of the vehicle speed SPD. Further, the determination vehicle speed may be changed to a speed other than 20 Km/h. In this case, the determination vehicle speed is determined in accordance with the performance characteristics of the engine 1.

(9) In the embodiments 1–12, the value of the closing compensation amount α is changed according to the difference between the relative pressure value DPBK and the starting pressure value KPBKL. However, the value of the closing compensation amount a may be constant.

(10) In the embodiments 1–12, the present invention is applied to the cylinder injection type engine 1. The present invention may also be applied to an engine that performs stratified charge combustion and semi-stratified charge combustion. For example, the present invention may be applied to an engine that injects fuel beneath the intake valves 6*a*, 6*b* provided in the associated intake ports 7*a*, 7*b*.

(11) In the illustrated embodiment, helical type intake ports are employed to produce swirls. However, the swirls do not necessarily have to be produced. In such case, parts such as the swirl control valve 17 and the step motor 19 may be eliminated.

Therefore, the present examples and embodiments are to be considered as illustrative and not restrictive and the invention is not to be limited to the details given herein, but may be modified within the scope and equivalence of the appended claims.

What is claimed is (US):

1. An apparatus for controlling vacuum in a vehicle, wherein the vehicle comprises:
   a) an engine, wherein the engine performs stratified combustion, the engine including:
      a combustion chamber;
      an air intake passage for introducing air to the combustion chamber;
      a throttle valve located in the intake passage for controlling airflow in the intake passage, the throttle valve being movable between a fully open position and a closed position, wherein the throttle valve is in an open position when the engine performs stratified charge combustion, and wherein the throttle valve operates to decrease the pressure in the intake passage when the throttle valve is moved toward the closed position; and
      an exhaust passage for discharging exhaust gas from the combustion chamber;
      recirculation means connecting the exhaust passage with the intake passage to recirculate some of the exhaust gas to the intake passage; and
      an exhaust gas regulator for regulating the flow of exhaust gas passing through the recirculation means;
   b) a brake booster for increasing the braking force of the vehicle, wherein the brake booster has a vacuum pressure chamber connected to the intake passage;
   c) detecting means for detecting the pressure of the vacuum chamber;
   d) determining means for determining whether the pressure in the vacuum chamber is higher than a reference level based on the detected pressure and for determining whether the pressure in the vacuum chamber is deficient; and
   e) a controller for controlling the exhaust gas regulator to positively restrict the recirculation of exhaust gas when the controller determines that the detected pressure is higher than the reference level.

2. The apparatus as set forth in claim 1, wherein the controller moves the throttle valve toward the closed position to decrease the pressure in the vacuum chamber when the determining means determines that the pressure of the vacuum chamber is deficient and after the recirculation of exhaust gas has been restricted.

3. The apparatus as set forth in claim 2, wherein the determining means determines that the vacuum pressure is deficient at the same time that it determines that the pressure in the vacuum chamber is higher than the reference level.

4. The apparatus as set forth in claim 1, wherein the engine performs homogeneous charge combustion when the vehicle speed is higher than a predetermined value and the determining means determines that the pressure of the vacuum chamber is deficient, and wherein the throttle valve has an opening size in accordance with the running conditions of the engine during homogeneous charge combustion.

5. The apparatus as set forth in claim 1, wherein the exhaust gas regulator includes a flow control valve located in the recirculation means to control the flow of recirculated exhaust gas.

6. Tho apparatus as set forth in claim 1, wherein the controller restricts the recirculation of exhaust gas sooner than it moves the throttle valve toward the closed position when the detected pressure is higher than the reference level.

7. The apparatus as set forth in claim 6, wherein the controller closes the flow control valve to prohibit exhaust gas from entering the intake passage when the detected pressure is higher than the reference level.

8. The apparatus as set forth in claim 1, wherein the controller moves the throttle valve at a first speed when reducing the pressure in the intake passage, and wherein the controller moves the flow control valve at a second speed when restricting the recirculation of exhaust gas, and wherein the first speed is lower than the second speed.

9. The apparatus as set forth in claim 1, wherein the controller closes the flow control valve to prohibit exhaust gas from entering the intake passage when the detected pressure is higher than the reference level.

10. The apparatus as set forth in claim 1, wherein the detecting means detects a difference between atmospheric pressure and the pressure in the vacuum chamber.

11. An apparatus for controlling vacuum in a vehicle, wherein the vehicle comprises:
    a) an engine, wherein the engine performs stratified combustion, the engine including:
       a combustion chamber;
       an air intake passage for introducing air to the combustion chamber;
       a throttle valve located in the intake passage for controlling airflow in the intake passage, the throttle valve being movable between a fully open position and a closed position, wherein the throttle valve is in an open position when the engine performs stratified charge combustion, and wherein the throttle valve decreases the pressure in the intake passage when the throttle valve is moved toward the closed position; and
       an exhaust passage for discharging exhaust gas from the combustion chamber;
       an exhaust gas recirculation passage connecting the exhaust passage with the intake passage to recirculate some of the exhaust gas to the intake passage; and
       an exhaust gas flow control valve for regulating the flow of exhaust gas passing through the recirculation passage;
    b) a brake booster for increasing the braking force of the vehicle, wherein the brake booster has a vacuum pressure chamber connected to the intake passage;

c) sensor for detecting the pressure of the vacuum chamber;

d) determining means for determining whether the pressure in the vacuum chamber is higher than a reference level based on the detected pressure and for determining whether the pressure in the vacuum chamber is deficient; and e) a controller for controlling the exhaust gas regulator to positively restrict the recirculation of exhaust gas when the controller determines that the detected pressure is higher than the reference level, wherein the controller moves the throttle valve toward the closed position to decrease the pressure in the vacuum chamber when the determining means determines that the pressure of the vacuum chamber is deficient and after the recirculation of exhaust gas has been restricted.

12. The apparatus as set forth in claim 11, wherein the engine performs homogeneous charge combustion when the vehicle speed is higher than a predetermined value and the determining means determines that the pressure of the vacuum chamber is deficient, and wherein the throttle valve has an opening size in accordance with the running conditions of the engine during homogeneous charge combustion.

13. The apparatus as set forth in claim 11, wherein the determining means determines that the vacuum pressure is deficient at the same time that it determines that the pressure in the vacuum chamber is higher than the reference level.

14. The apparatus as set forth in claim 13, wherein the controller moves the flow control valve to restrict exhaust gas recirculation faster than it moves the throttle valve toward the closed position when the detected pressure is higher than the reference level.

15. The apparatus as set forth in claim 14, wherein the controller closes the flow control valve to prohibit exhaust gas from entering the intake passage when the detected pressure is higher than the reference level.

16. The apparatus according to claim 11, further comprising a motor for driving the throttle valve, wherein the motor is driven by the controller.

17. The apparatus as set forth in claim 11, wherein the controller closes the flow control valve to prohibit exhaust gas from entering the intake passage when the detected pressure is higher than the reference level.

18. The apparatus as set forth in claim 11, wherein the detecting means detects a difference between atmospheric pressure and the pressure in the vacuum chamber.

19. A method for controlling vacuum in a vehicle comprising:

controlling air flow to an engine through an intake passage with a throttle valve;

producing, at selected times, a vacuum in the engine with the throttle valve;

recirculating exhaust from the engine to the intake passage at certain times;

employing the vacuum produced in the engine to maintain a vacuum in a vacuum chamber, which is used to increase a vehicle braking force;

detecting the pressure of the vacuum chamber;

determining whether the pressure of the vacuum chamber is higher than a reference level;

determining whether the pressure in the vacuum chamber is at a deficiency level;

restricting the recirculation of exhaust gas when the detected pressure is higher than the reference level; and controlling the throttle valve to reduce the pressure in the intake passage and consequently to reduce the pressure in the vacuum chamber when it is determined that the pressure in the vacuum chamber is at the deficiency level.

20. The method of claim 19, including the step of determining that the pressure in the vacuum chamber is at a deficiency level when the detected pressure is higher than the reference level.

* * * * *